United States Patent [19]
Fogelberg

[11] 3,993,152
[45] Nov. 23, 1976

[54] AUTOMATIC FOUR-WHEEL DRIVE TRANSFER CASE

[75] Inventor: Mark J. Fogelberg, Muncie, Ind.

[73] Assignee: Borg-Warner Corporation, Chicago, Ill.

[22] Filed: Apr. 28, 1975

[21] Appl. No.: 572,690

[52] U.S. Cl............................ 180/44 R; 74/665 D; 192/35
[51] Int. Cl.² ........................................ B60K 17/34
[58] Field of Search.............. 180/44 R; 74/665 D, 74/710; 192/35

[56] References Cited
UNITED STATES PATENTS

| | | | |
|---|---|---|---|
| 1,351,084 | 8/1920 | Winther | 180/44 R |
| 2,399,201 | 4/1946 | Buckendale et al. | 180/44 R X |
| 2,699,852 | 1/1955 | Cost | 180/44 R X |
| 2,796,941 | 6/1957 | Hill | 180/44 R |
| 2,851,115 | 9/1958 | Buckendale | 180/44 R X |
| 2,853,890 | 9/1958 | Kelbel | 180/44 R X |
| 3,221,574 | 12/1965 | Sampictro et al. | 180/44 R X |
| 3,300,002 | 1/1967 | Roper | 192/35 |
| 3,848,691 | 11/1974 | Dolan | 180/44 R |
| 3,864,990 | 1/1975 | Lacosta | 74/665 D |
| 3,901,102 | 8/1975 | Manwaring | 74/710 |

FOREIGN PATENTS OR APPLICATIONS 899,607  8/1944  France .................. 180/44

*Primary Examiner*—Kenneth H. Betts
*Attorney, Agent, or Firm*—Julian Schachner

[57] ABSTRACT

A power transfer mechanism incorporated in a multiple path drive system comprises a transfer case disposed between a source of input torque and a pair of drive axles. Torque is transferred directly to one drive axle and is transferred automatically to the other drive axle through a double-acting roller clutch when required. The transfer case is constructed such that it may be assembled in two configurations; one in which the output shafts are coaxial and offset from the input shaft, and the other in which the input shaft and one output shaft are coaxial, the other output shaft being offset therefrom.

11 Claims, 4 Drawing Figures

AUTOMATIC FOUR-WHEEL DRIVE TRANSFER CASE

BACKGROUND OF THE INVENTION

1. Field of the Invention

This invention relates generally to a power transfer mechanism adapted to be incorporated in a multiple path drive system, for example, a four-wheel drive vehicle. More particularly, it relates to a torque transfer case adapted to receive torque from a prime mover and to provide torque for one drive axle where two-wheel drive is adequate, and to provide torque for both drive axles automatically where four-wheel drive is required. The torque transfer case may be assembled in either of two configurations using interchangeable parts.

2. Description of the Prior Art

In recent years there have been many improvements in automotive drive trains, including improvements relating to the transfer of torque from a prime mover to drive axles. Where four-wheel drive systems are used, transfer cases have been developed which generally provided torque transfer to one output to drive an axle and to another output for driving another axle. Some such transfer cases generally have included some form of differential mechanism for allowing relative rotation between the output shafts. Suitable controls were provided for engaging and disengaging the four-wheel drive function externally, as desired. Other such transfer cases included a mechanism which automatically engages and disengages the four-wheel drive function. Separate torque transfer cases provided for establishing each torque transfer path desired. Transfer cases have been developed for providing torque transfer from an input to one output coaxial therewith and another output offset therefrom. Other transfer cases have been developed for providing torque transfer from an input to a pair of offset outputs. There remains a need to provide a single torque transfer case which may be assembled economically for providing torque transfer in either configuration, as desired.

Accordingly, it is an object of this invention to meet the continuing need and desire in the art for improvements in the transmission of torque by providing an improved torque transfer mechanism which normally provides torque transfer to one output shaft for establishing a two-wheel drive condition, and which automatically engages for providing torque transfer to two output shafts for establishing a four-wheel drive condition. The improved mechanism is easily adaptable to either of two configurations to provide desired torque transfer paths in a four-wheel drive vehicle. The adaptability results in a simple and economic torque transfer mechanism which is easy to fabricate and assemble.

SUMMARY OF THE INVENTION

This invention is directed in brief to an improved four-wheel drive transfer case for use between a prime mover and a pair of drive axles. The mechanism includes a transfer case adaptable for transferring torque from an input to one output directly and to another output through a double-acting roller clutch. The clutch includes a roller cage which is frictionally biased by the case housing, thus tending to engage the clutch. The arrangement is such that the output connected with the front axle normally rotates faster than the output connected with the rear axle. In this condition, the clutch freewheels and no power is transmitted to the front axle. If the rear wheels lose traction in either direction of rotation, the rear output shaft will speed up until it rotates at the same speed as the front output shaft. The clutch then engages due to the frictional bias, and torque is transferred to the front output to drive the front axle. When traction is restored to the rear wheels, the roller clutch disengages and the system reverts back to a conventional two-wheel drive condition.

The transfer case is adaptable for transferring torque from an input to a pair of coaxial outputs offset therefrom on the one hand, and from an input to one output coaxial therewith and another output offset therefrom on the other hand. In each case the automatic engaging and disengaging feature is provided.

The adaptability of the improved transfer case is obtained easily and simply. It results from a sub-assembly available in either of two configurations. In either, one of the output shafts is driven directly from the input shaft. The other is driven through a double-acting clutch. All of the parts used in the transfer case, including the sub-assembly in either configuration, are interchangeable. Thus, the requirements of various vehicle manufacturers for four-wheel drive power trains having torque transfer paths with one configuration or the other may be easily and simply satisfied with a single simplified and economical assembly.

BRIEF DESCRIPTION OF THE DRAWINGS

The objects and advantages of this invention will become apparent to those skilled in the art upon careful consideration of the specification herein, including the drawings, wherein.

Figure 1:
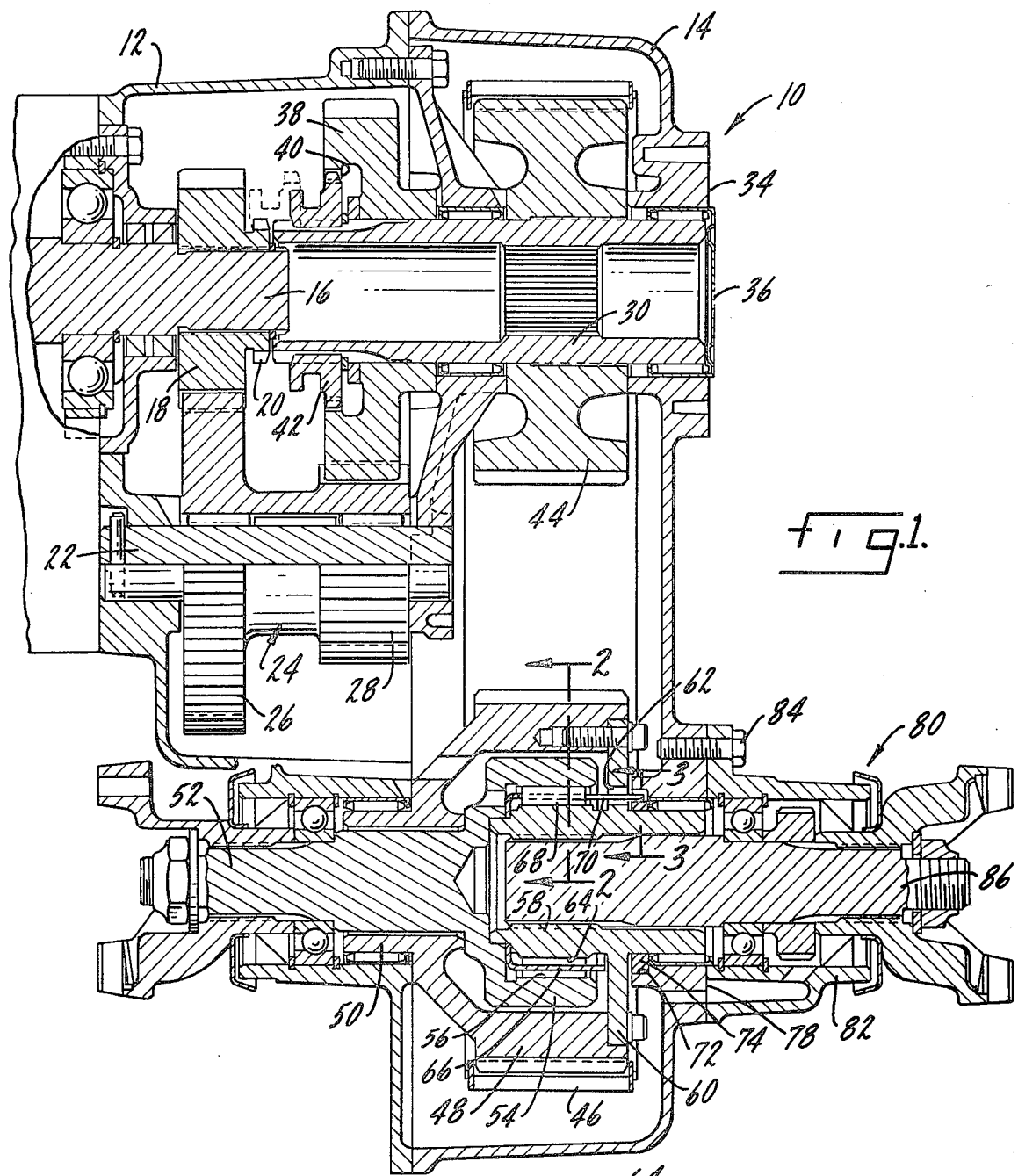
FIG. 1 is a sectional view showing details of the torque transfer case in a first configuration thereof wherein coaxial output shafts are offset from the input shaft.

While this invention is susceptible of embodiment in many different forms, there is shown in the drawings and will herein be described in detail a preferred embodiment with the understanding that the present disclosure is to be considered as an exemplification of the principles of the invention and is not intended to limit the invention to this embodiment.

DESCRIPTION OF THE PREFERRED EMBODIMENT

Referring now to FIG. 1 in greater detail, there is shown generally a torque transfer case 10 particularly adapted for use in an automotive vehicle incorporating a four-wheel drive system. Torque transfer case 10 is suitable for transmitting torque from a prime mover through a plurality of drive axle assemblies to drive front and rear pairs of traction wheels.

Torque transfer case 10 includes housing sections 12 and 14 suitably secured together. An input shaft 16 is rotatably supported by housing section 12 and is received within transfer case 10. Input shaft 16 extends therefrom to receive torque, for example, from an associated transmission of an automotive vehicle. It should be understood that input shaft 16 may be the output shaft of such a transmission. A gear 18 is splined to input shaft 16 for rotation therewith. Gear 18 defines dog teeth 20.

A countershaft 22 is secured within transfer case 10. A cluster gear assembly 24 is rotatably supported by countershaft 22. Cluster gear assembly 24 includes a gear 26 in mesh with gear 18, and a gear 28.

A sleeve 30 is rotatably received within transfer case 10 and is in alignment with input shaft 16 and an opening defined by end face 34 of housing section 14. In the configuration shown in FIG. 1, a bearing end 36 is provided to seal this opening. A gear 38 is rotatably supported by sleeve 30, and is in mesh with gear 28. Gear 38 defines dog teeth 40.

A suitable engaging collar 42 is supported by sleeve 30 for rotation therewith, and is slidable between a rightward position shown in solid lines wherein it is engaged with teeth 40 of gear 38, and a leftward position shown in dotted lines wherein it is engaged with teeth 20 of gear 18. In the rightward position, a path is established from input shaft 16 through a first reduction gearset including gears 18 and 26, through a second reduction gearset including gears 28 and 38, and through collar 42 to sleeve 30. With collar 42 in the leftward position, a path is established from input shaft 16 through gear 18 and collar 42 to sleeve 30.

A sprocket 44 is splined to sleeve 30 for rotation therewith. Sprocket 44 engages a suitable chain 46, which in turn engages a sprocket 48. Sprocket 44, chain 46 and sprocket 48 form a chain drive train. Sprocket 48 includes a sleeve portion 50 rotatably supported by transfer case 10.

Figure 2:
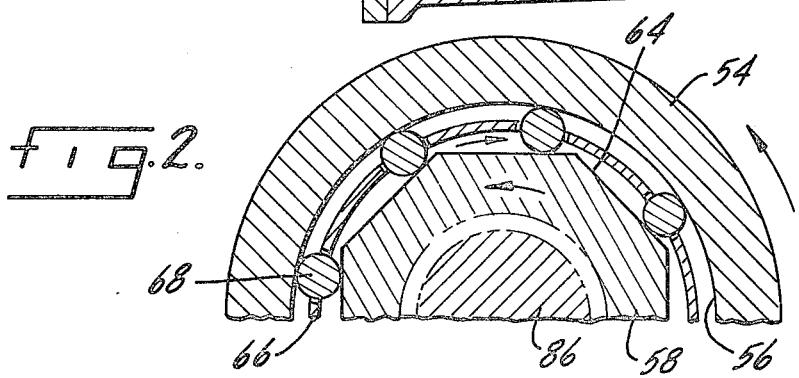
FIG. 2 is a sectional view taken along the line 2—2 of FIG. 1 showing details of the double-acting roller clutch in one of its engaged positions.

An output or propeller shaft 52 extends through sleeve portion 50 of sprocket 48 and is supported for rotation relative thereto. Output shaft 52 defines an annular extension 54, the inner surface of which forms an outer race 56 of cylindrical configuration. A sleeve 58 is rotatably supported by transfer case 10. Sleeve 58 includes a flange 60 suitably secured to sprocket 48 for rotation therewith. Flange 60 defines a plurality of openings 62 extending therethrough. The outer surface of sleeve 58 forms an inner race or rolling ramp 64 of polygonal configuration, for example. A roller cage 66 supports a plurality of rollers 68. One roller 68 is provided for each face of inner race 64. Roller cage 66 defines a plurality of fingers 70 extending through openings 62 of flange 60. As best shown in FIG. 2, annular extension 54, sleeve 58, roller cage 66 and rollers 68 form a double-acting overrunning roller clutch.

Figure 3:
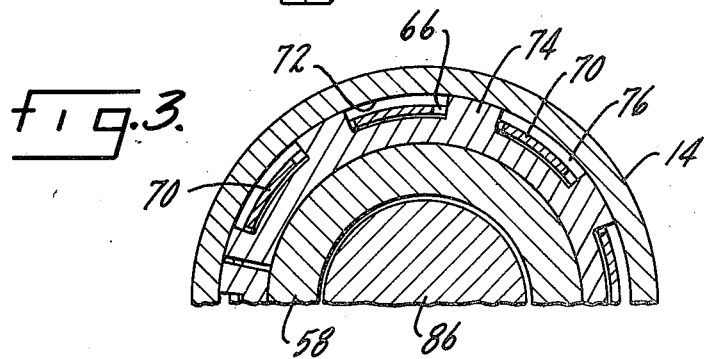
FIG. 3 is a sectional view taken along the line 3—3 of FIG. 1 showing details of the arrangement for frictionally engaging the roller cage with the transfer case housing.

As best shown in FIG. 3, a cylindrical channel 72 is defined by housing section 14. A split ring 74 is frictionally engaged in channel 72. Split ring 74 defines a plurality of slots 76 in alignment with fingers 70 of roller cage 66. Fingers 70 extend into slots 76.

Housing section 14 forms an end face 78 similar to end face 34. End face 78 defines an opening in alignment with output shaft 52 and sleeve 58. A sub-assembly 80 includes a housing 82 suitably secured to end face 78 of housing section 14, for example, by a plurality of bolts 84. An output or propeller shaft 86 is rotatably supported by housing 82. Output shaft 86 extends into sleeve 58 and is splined thereto for rotation therewith.

In the configuration shown in FIG. 1, the operation of transfer case 10 is as follows. Assuming collar 42 is in its rightward position, torque will be received by input shaft 16 and transferred through the first reduction gearset including gears 18 and 26, through the second reduction gearset including gears 28 and 38, and through collar 42 to sleeve 30. Assuming collar 42 is in its leftward position, torque will be received by input shaft 16 and transferred through gear 18 and collar 42 to sleeve 30. As sleeve 30 rotates, torque is transferred through the chain drive train including sprocket 44, chain 46 and sprocket 48. Sprocket 48 carries flange 60 of sleeve 58, which causes rotation of output shaft 86.

In one form of the invention, output shaft 86 may be connected to a rear drive axle assembly of an associated vehicle. Output shaft 52 may be connected to the front drive axle assembly of an associated vehicle. Output shaft 52 normally rotates faster than output shaft 86. This is inherent when the vehicle is turning, since the front wheels travel through a larger radius than do the rear wheels. For straight ahead movement, this may be accomplished by providing front and rear axles having slightly different gear ratios, front wheels slightly smaller than rear wheels, or by inflating the front tires to a pressure slightly less than that in the rear tires. Other suitable means may be provided for causing output shaft 52 normally to rotate faster than output shaft 86.

In normal operation, outer race 56 is rotating faster than inner race 64. Due to the engagement of fingers 70 with split ring 74, which in turn is in frictional contact with housing section 14, balanced radial forces are developed which results in a relative drag effect on roller cage 66. The drag is developed without an axial force acting on roller cage 66, and thus there is no tendency for roller cage 66 to bind. As shown in FIG. 2, output shaft 86 and sleeve 58 are rotating in the counterclockwise direction. Output shaft 52 and annular extension 54 are also rotating in the counterclockwise direction, but slightly faster than output shaft 86 and sleeve 58. The drag effect on roller cage 66 causes rollers 68, in effect, to rotate relatively in the clockwise direction. Rollers 68 tend to wedge between inner race 64 and outer race 56 so as to engage the clutch. However, due to the fact that outer race 56 is rotating faster than inner race 64, a force is developed which acts on rollers 68 such that they will be carried in the counterclockwise direction, relatively, to their freewheeling position. Thus, the clutch is not engaged. As a result, torque is transferred to output shaft 86 but not to output shaft 52. In this condition, the operation is essentially that of a conventional two-wheel drive vehicle.

If the rear wheels lose traction, output shaft 86 will speed up until it is rotating at the same speed as is output shaft 52. The drag effect on roller cage 66 will cause rollers 68 to wedge between inner race 64 and outer race 56 when output shafts 52 and 86 are rotating at the same speed. When this takes place, torque will be transferred through the clutch to output shaft 52 as well as to output shaft 86. In this condition, the operation is essentially that of a conventional four-wheel drive vehicle.

When the rear wheels regain traction, output shaft 86 will again rotate slower than output shaft 52, and rollers 68 will be carried to a freewheeling position, thereby disengaging the clutch and restoring the vehicle to the two-wheel drive condition. Thus, it will be seen that the transfer case provides for establishment of four-wheel drive automatically as required, and for establishment of two-wheel drive automatically when four-wheel drive is not required.

Figure 4:
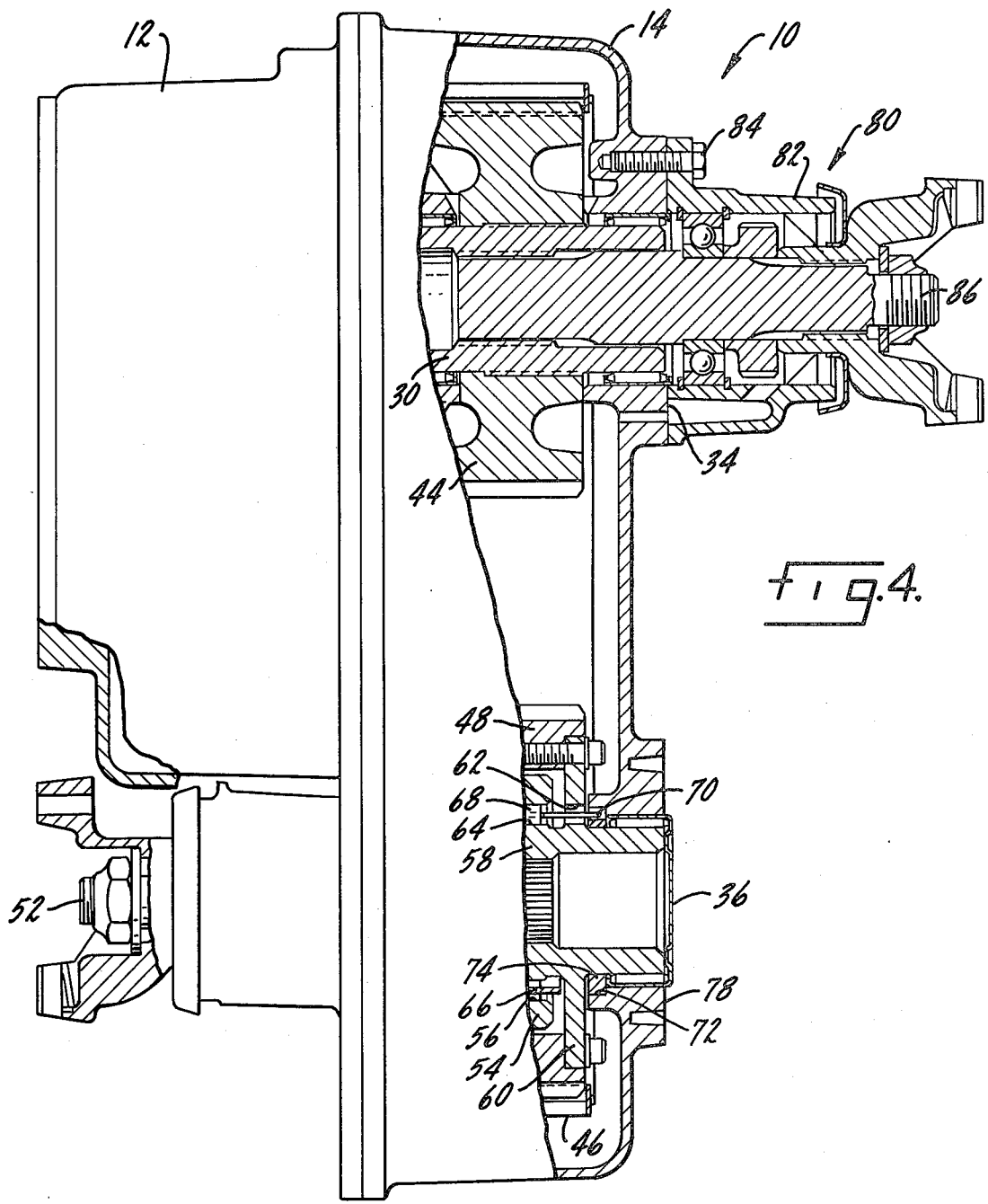
FIG. 4 is a partial sectional view, similar to FIG. 1, showing details of the torque transfer case in a second configuration thereof wherein one output shaft is coaxial with the input shaft and the other output shaft is offset therefrom.

Turning now to the configuration shown in FIG. 4, torque transfer case 10 may be assembled so as to provide one output shaft coaxial with the input shaft and another output shaft on an axis offset therefrom. Sub-assembly 80 is secured to face 34 of housing section 14, for example, by bolts 84. Output shaft 86 extends into sleeve 30 and is splined thereto for rotation therewith. Bearing end 36 seals the opening defined by face 78 of housing section 14. This is all that is required to complete modification, as all of the parts are interchangeable.

In the configuration shown in FIG. 4, torque is transferred from sleeve 30 to output shaft 86. Operation of the roller clutch is the same as in the configuration shown in FIG. 1, and torque will not be transferred to output shaft 52 until output shaft 86 speeds up so as to rotate at the same speed as output shaft 52. At this time, the roller clutch will engage automatically, as hereinabove described.

It should be noted that operation of the transfer case will be the same when the vehicle is moving in either the forward or rearward directions; that is, with rotation of shafts 52 and 86 in the clockwise or counter-clockwise directions.

The simplicity of this mechanism is apparent. It will be seen that a transfer case has been provided which normally drives one output shaft to provide conventional two-wheel drive for an associated vehicle. When required, a double-acting roller clutch engages automatically to provide drive to both output shafts so as to establish four-wheel drive. When four-wheel drive is no longer required, the clutch automatically disengages and the system reverts to conventional two-wheel drive. The mechanism operates in either forward or reverse automatically.

The transfer case is such that it may be assembled in either of two configurations. In one configuration the input is on one axis and a pair of outputs are on another axis offset from the input axis. In another configuration, the input and one output are on one axis and the other output is on another axis offset therefrom. Assembly in either configuration is simple, as interchangeable parts are used throughout.

In either configuration, a high speed-low torque drive may be established or, alternatively, a low speed-high torque drive may be established when suitable reduction gearing is engaged.

It should be understood that while a preferred embodiment of the invention has been shown and described, this is illustrative and may be modified by those skilled in the art without departing from the scope thereof, which is to be limited only by the claims herein.

I claim:

1. A torque transfer assembly comprising a housing, an input shaft rotatably supported by said housing, first and second output shafts rotatably supported by said housing, means coupling said input shaft with said first output shaft for effecting torque transfer thereto, said first output shaft connected with an inner race having a plurality of wedging surfaces, said second output shaft connected with an outer race having a cylindrical surface, a roller cage in frictional contact with said housing, and a plurality of rollers supported by said roller cage between said races, said rollers being movable relative to said races between a freewheeling position and at least one position wedged between said races for effecting torque transfer to said second output shaft, said coupling means including a first sleeve driven by said input shaft, and a second sleeve driven with said first sleeve, said second sleeve defining said inner race, and said first output shaft driven by one of said sleeves.

2. The invention of claim 1, said coupling means including first and second sprockets rotatable with said first and second sleeves, respectively, and a chain engaging said sprockets for torque transfer therebetween.

3. The invention of claim 2, said second sleeve defining a flange secured to said second sprocket, said flange defining a plurality of openings therethrough, and said roller cage defining a plurality of fingers extending through said openings to effect said frictional contact with said housing.

4. The invention of claim 3, said housing defining a channel, and a split ring frictionally engaging said housing in said channel and defining a plurality of grooves, said fingers engaging said split ring within said grooves for effecting said frictional contact with said housing thereby developing balanced radial drag forces acting on said roller cage.

5. The invention of claim 1, said first output shaft connected to said first sleeve for rotation thereby.

6. The invention of claim 1, said first output shaft connected to said second sleeve for rotation thereby.

7. The invention of claim 1, said housing including a sub-assembly, said first output shaft rotatably supported by said sub-assembly, said sub-assembly being matable with said housing in a first configuration in which said first output shaft is coaxial with said input shaft and connected to said first sleeve, and in a second configuration in which said first output shaft is coaxial with said second output shaft and connected to said second sleeve.

8. The invention of claim 2, reduction gearing supported by said housing, and means coupling said input shaft with said first sleeve directly and through said reduction gearing, selectively.

9. In a four-wheel drive vehicle having a transfer case for transferring torque from a source of power to front and rear pairs of traction wheels; the combination wherein the transfer case comprises a housing, an input shaft supported by said housing, front and rear output shafts supported by said housing, and means in said housing for transferring torque from said input shaft to said output shafts, said means connecting said input shaft with said rear output shaft and including a double-acting clutch in said housing connected with said front output shaft, said clutch including a first race rotatable with said rear output shaft, a second race rotatable with said front output shaft, a roller cage in frictional engagement with said housing, and a plurality of roller elements carried by said roller cage between said races and movable between clutch engaging and disengaging positions, said frictional engagement of said roller cage with said housing developing a first force tending relatively to move said rollers toward said engaging position, rotation of said front output shaft faster than said rear output shaft developing a second force tending relatively to overcome said first force and move said rollers toward said disengaging position, said means further including first and second drive elements in driven engagement with said input shaft, said first drive element including a first sleeve coaxial with and in driven engagement with said input shaft, and a sprocket splined to said first sleeve, said second drive element including a second sleeve coaxial with said front output shaft and defining said inner race, and a sprocket connected to said second sleeve, and said rear output shaft splined to one of said sleeves.

10. The invention of claim 9, said housing including a housing sub-assembly supporting said rear output shaft, said sub-assembly being matable with said housing selectively in a first configuration in which said rear output shaft is coaxial with said front output shaft and in a second configuration in which said rear output shaft is coaxial with said input shaft.

11. A transfer case for an automotive vehicle drive system wherein said system may be shifted from two-wheel to four-wheel drive; the transfer case comprising a housing, an input shaft extending into said housing and a pair of output shafts extending from opposite sides of said housing, two of said shafts being coaxially aligned, means for converting between coaxial alignment of both output shafts and coaxial alignment of one output shaft with said input shaft, said means including a pair of internally splined sleeves, one of said sleeves coaxial with said input shaft and the other of said sleeves offset therefrom, said input shaft driving said sleeves, said one output shaft being externally splined and adapted to be telescopically received in either one of said sleeves to be driven thereby, said output shafts having a predetermined speed relationship, and a clutch operatively connecting said output shafts upon a predetermined change in said speed relationship.

* * * * *